(12) United States Patent
Pattinson et al.

(10) Patent No.: US 8,876,466 B2
(45) Date of Patent: Nov. 4, 2014

(54) ABRADABLE LINER

(75) Inventors: Glen Pattinson, Derby (GB); Andrew Hewitt, Derby (GB)

(73) Assignee: Rolls-Royce PLC, London (GB)

( * ) Notice: Subject to any disclaimer, the term of this patent is extended or adjusted under 35 U.S.C. 154(b) by 7 days.

(21) Appl. No.: 13/417,611

(22) Filed: Mar. 12, 2012

(65) Prior Publication Data

US 2012/0248708 A1    Oct. 4, 2012

(30) Foreign Application Priority Data

Apr. 4, 2011   (GB) .................................. 1105624.9

(51) Int. Cl.
| | |
|---|---|
| F04D 31/00 | (2006.01) |
| B23K 26/32 | (2014.01) |
| F01D 11/12 | (2006.01) |
| C23C 30/00 | (2006.01) |
| F04D 29/16 | (2006.01) |
| B23K 26/34 | (2014.01) |
| B23K 26/20 | (2014.01) |
| C23C 8/02 | (2006.01) |

(52) U.S. Cl.
CPC ............. *C23C 8/02* (2013.01); *B23K 2201/001* (2013.01); *B23K 26/3213* (2013.01); *F01D 11/122* (2013.01); *C23C 30/005* (2013.01); *F04D 29/164* (2013.01); *B23K 26/3206* (2013.01); *B23K 26/345* (2013.01); *B23K 26/206* (2013.01); *B23K 26/3233* (2013.01); *B23K 26/322* (2013.01)
USPC ....................................... 415/116; 415/174.3

(58) Field of Classification Search
USPC .................. 277/414, 41; 415/9, 173.4, 173.5, 415/174.4, 174.5
See application file for complete search history.

(56) References Cited

U.S. PATENT DOCUMENTS

| | | | | |
|---|---|---|---|---|
| 3,825,364 | A | * | 7/1974 | Halila et al. ................... 415/116 |
| 3,964,877 | A | * | 6/1976 | Bessen et al. ................... 75/246 |
| 5,024,884 | A | | 6/1991 | Otfinoski |
| 5,780,116 | A | | 7/1998 | Sileo et al. |
| 7,775,766 | B2 | * | 8/2010 | Meier et al. ................ 415/173.4 |
| 2004/0012152 | A1 | * | 1/2004 | Grunke et al. ................ 277/415 |
| 2007/0122269 | A1 | * | 5/2007 | Meier et al. ................ 415/173.1 |
| 2010/0143103 | A1 | * | 6/2010 | Sellars et al. ............. 415/173.4 |

FOREIGN PATENT DOCUMENTS

| | | |
|---|---|---|
| EP | 1 108 857 A2 | 6/2001 |
| EP | 1 270 876 A2 | 1/2003 |
| GB | 2 152 080 A | 7/1985 |
| GB | 2 398 844 A | 9/2004 |

OTHER PUBLICATIONS

Jul. 27, 2011 British Search Report issued in Patent Application No. 1105624.9.

* cited by examiner

*Primary Examiner* — Vishal Patel
*Assistant Examiner* — Thomas Neubauer
(74) *Attorney, Agent, or Firm* — Oliff PLC

(57) ABSTRACT

A seal is provided between first and second relatively movable members. The seal comprises a liner attached to the first relatively movable member which liner is abraded by the second relatively movable member. The abradable liner comprises a metallic, open porous structure formed by fusing a metallic feedstock with an energy beam to build up sequential deposits of the fused feedstock.

3 Claims, 2 Drawing Sheets

ABRADABLE LINER

FIELD OF THE INVENTION

The present invention relates to a seal comprising an abradable liner.

BACKGROUND OF THE INVENTION

With reference to FIG. 1, a ducted fan gas turbine engine generally indicated at 10 has a principal and rotational axis X-X. The engine comprises, in axial flow series, an air intake 11, a propulsive fan 12, an intermediate pressure compressor 13, a high-pressure compressor 14, combustion equipment 15, a high-pressure turbine 16, and intermediate pressure turbine 17, a low-pressure turbine 18 and a core engine exhaust nozzle 19. A nacelle 21 generally surrounds the engine 10 and defines the intake 11, a bypass duct 22 and a bypass exhaust nozzle 23.

The gas turbine engine 10 works in a conventional manner so that air entering the intake 11 is accelerated by the fan 12 to produce two air flows: a first air flow A into the intermediate pressure compressor 14 and a second air flow B which passes through the bypass duct 22 to provide propulsive thrust. The intermediate pressure compressor 13 compresses the air flow A directed into it before delivering that air to the high pressure compressor 14 where further compression takes place.

The compressed air exhausted from the high-pressure compressor 14 is directed into the combustion equipment 15 where it is mixed with fuel and the mixture combusted. The resultant hot combustion products then expand through, and thereby drive the high, intermediate and low-pressure turbines 16, 17, 18 before being exhausted through the nozzle 19 to provide additional propulsive thrust. The high, intermediate and low-pressure turbines respectively drive the high and intermediate pressure compressors 14, 13 and the fan 12 by suitable interconnecting shafts.

The compressor rotor blades are surrounded by a compressor casing. A small gap, or clearance, is provided radially between the tips of the compressor rotor blades and the compressor rotor casing. The compressor casing is provided with an abradable liner on its radially inner surface immediately around the tips of the compressor rotor blades. These abradable liners wear preferentially relative to the material of the tips of the compressor rotor blades during engine service. The abradable liners reduce over tip leakage between the tips of the compressor rotor blades and the compressor casing and hence reduce the associated loss in engine efficiency and engine performance.

Abradable liners are also used on the turbine casing, which is arranged radially around stages of turbine rotor blades. Abradable liners are also used on other components of gas turbine engines where there is a requirement to form a seal between a rotatable or movable component and a static component.

Conventional abradable liners are typically thermally sprayed (eg plasma sprayed) metal coatings for compressors, and thermally sprayed ceramic coatings for turbines. These coatings have to provide a balance in mechanical properties between a requirement to be soft enough to be abraded and hard enough to resist erosion. Thus thermally sprayed abradables generally have a metallic matrix (eg based on Ni, Cr or Al) and a dislocator phase to impart improved cutting characteristics.

However, there are disadvantages associated with thermally sprayed abradables. in particular, the coatings are generally limited to thicknesses of about 2 to 3 mm, as increased thicknesses can increase susceptibility to cracking and spalling due to thermal expansion coefficient mismatches and residual stresses. Other disadvantages include: difficulties with process control which can lead to coating variability and defects, resulting in blade damage or erosive abradable failures; and significant powder feedstock wastage (typically about 50%) during spraying.

An alternative to thermally sprayed abradables consists of a liner formed from a mesh of sintered fine iron-based wires brazed directly to a casing. Such liners are commonly used at operational temperatures of greater than 350° C. However, the precise structure of the mesh can be difficult to control during manufacture of the liner. Further, in use, heat can be generated through friction between the rotating member and the mesh.

SUMMARY OF THE INVENTION

Accordingly, an aim of the present invention is to provide an abradable liner with improved characteristics.

Thus, a first aspect of the present invention provides a seal between first and second relatively movable members, the seal comprising a liner attached to the first relatively movable member which liner is abraded by the second relatively movable member, the abradable liner comprising a metallic, open porous structure formed by fusing a metallic feedstock with an energy beam to build up sequential deposits of the fused feedstock.

Using an energy beam to build up sequential deposits of the fused feedstock allows precise control of the structure of the liner to be achieved. In this way product variability can be reduced. Also the structure of the liner can be functionally tailored throughout its thickness to meet the attributes required for the intended operational environment.

The seal may have any one or, to the extent that they are compatible, any combination of the following optional features.

The energy beam may be e.g. a laser beam, electron beam or electric arc. The feedstock may be a metal powder or a metal wire.

The liner thickness may be greater than 2 mm and preferably greater than 5 or 10 mm. The liner thickness may be up to 50 mm. Relatively thick liners are possible due to the possibility to tailor and control the properties of the liner, and to the ability to form a strong bond (eg by local melting) at the interface between the liner and the first member.

The first and second members may be relatively rotatable members. For example, one of the first and second members may be a rotor and the other of first and second members may be a stator. In particular, the rotor may comprise a plurality of rotor blades, the stator may comprise a casing, the abradable liner can be attached to the casing, and the liner can be abraded by the rotor blades. However, the seal may be used in other applications, such as oil or air seals on shafts, discs and drums e.g. with knife type fins cutting into the abradable liner.

The metallic feedstock may typically be nickel, iron, chromium or cobalt, or may be an alloy of nickel, iron, chromium or cobalt, the choice of metal depending on the application.

The abradable liner can have a plurality of sub-layers of varying pore size. For example, the abradable liner may have a top sub-layer having a relatively small pore size, and an underlying sub-layer having a relatively large pore size. The top sub-layer can thus provide good cutting and sealing properties, while the underlying sub-layer can have an enhanced compliance which reduces strain energy in the liner, and allows the liner to collapse to an extent during rubbing, to reduce the energy required to cut the abradable He seal may further comprise one or more baffle plates which traverse the thickness of the abradable liner to reduce fluid leakage over the surface of the first movable member through the liner.

The pores of the abradable liner can be filled with a further material, such as a polymer, further metal or ceramic, eg to provide enhanced cutting or sealing characteristics.

Preferably, the first and second relatively movable members are components of a gas turbine engine.

A second aspect of the present invention provides a method of forming a seal between first and second relatively movable members, the method comprising:

fusing a metallic feedstock with an energy beam to build up sequential deposits of the fused feedstock into a metallic, open porous structure, wherein the metallic, open porous structure is attached to the first member to form an abradable liner on the first member so that, in use, the abradable liner can be abraded by the second movable member.

Thus the method can be used to produce a seal of the first aspect. Accordingly, optional features of the first aspect apply also to the method of the second aspect.

The metallic, open porous structure may be attached to the first member by fusing an initial deposit of feedstock onto the first member, and building up the sequential deposits of fused feedstock thereupon. Alternatively, the metallic, open porous structure may attached to the first member (eg by brazing, welding, mechanical fixture or a combination thereof) after the structure has been formed.

BRIEF DESCRIPTION OF THE DRAWINGS

Embodiments of the invention will now be described by way of example with reference to the accompanying drawings in which.

DETAILED DESCRIPTION

Figure 1:
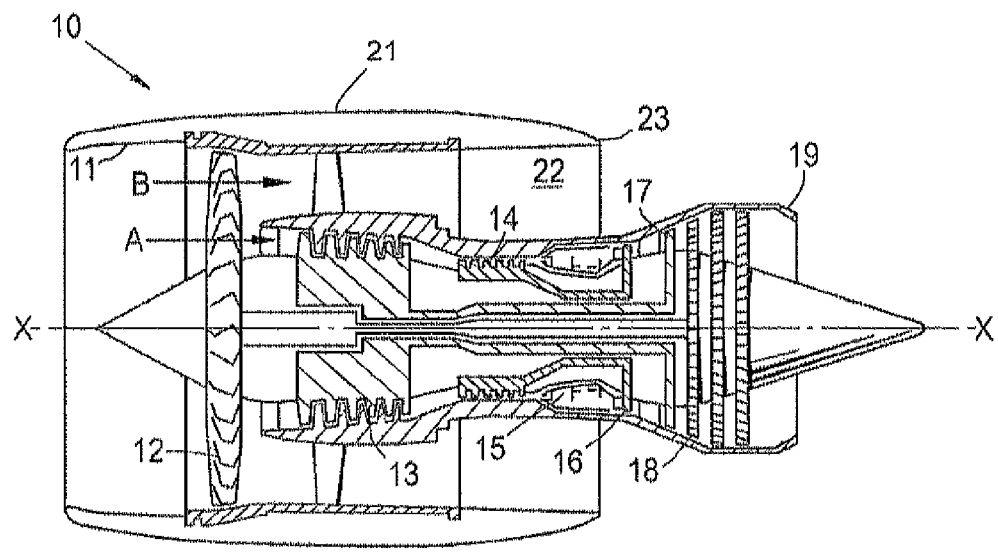
FIG. 1 shows a schematic longitudinal cross-section through a ducted fan gas turbine engine.
Figure 2:
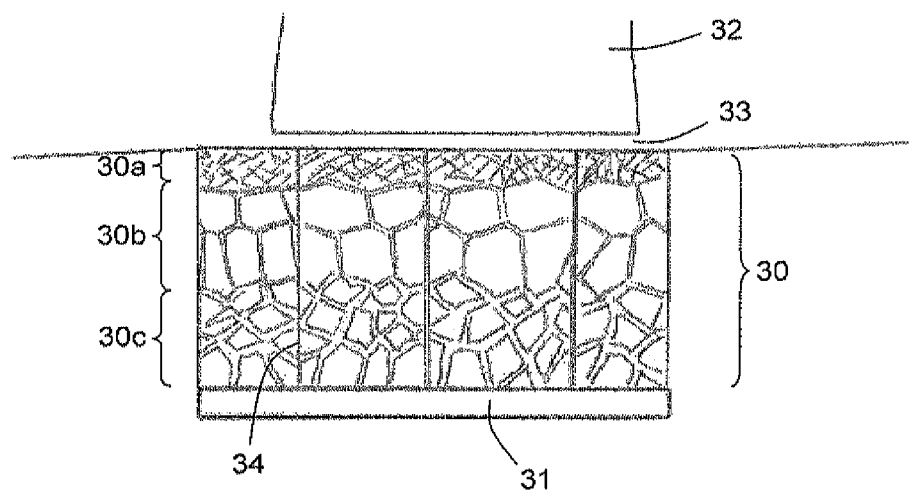
FIG. 2 shows a schematic cross-section through a seal comprising an abradable liner attached to a gas turbine engine casing.

FIG. 2 shows a schematic cross-section through a seal comprising an abradable liner 30 attached to a gas turbine engine casing 31. The tip of a compressor or turbine blade 32, which is one of a row of such blades attached to a rotor disc, passes over the casing with a clearance gap 33 determined by abrasion of the liner by the blade tips.

The liner has a metallic, open porous structure. At the surface of the liner, an outer layer 30a of the liner 30 has a fine structure with a relatively small pore size which provides good cutting and sealing properties. Beneath the outer layer 30a, a mid-layer 30b of the liner has a coarser structure with a relatively large pore size, and possibly thinner pore walls, which provides the mid-layer with increased compliance and deformability, helping to mechanically isolate the outer layer from the casing 31 and to reduce build ups of strain energy in the liner which might otherwise lead to cracking or spallation of the liner. The mid-layer is thus significant in allowing relatively thick liners to be produced, eg up to 50 mm in thickness. The mid-layer can also collapse to an extent during rubbing, to reduce the blade energy required to cut the abradable. Joining the mid-layer to the casing, an inner layer 30c of the liner has a structure with a pore size between that of the outer layer and the mid-layer. Having a smaller pore size than the mid-layer helps to increase the number of attachment points between the liner and the casing and hence to increase the strength of the attachment, while having a larger pore size than the outer lay maintains a degree of compliance and deformability that can help to reduce stress build up at the liner/casing interface.

A plurality of spaced baffle plates 34 traverse the thickness of the liner 30 in order to prevent gas leakage over the surface of the casing through the open porosity of the liner (ie bypassing the clearance gap 33).

The metallic, open porous structure of the liner 30 can conveniently be produced by melting a metal powder feedstock with a laser beam to build up sequential fused deposits of the metal. However, other feedstocks may be used, such as wire feedstocks. Also other energy beams may be used, such as electron beams or electric arcs. Suitable deposition procedures are known to the skilled person. For example U.S. Pat. No. 6,811,744 proposes forming three-dimensional structures defined by CAD solid models using layer-by-layer deposition. U.S. Pat. No. 4,323,756 proposes a method of fabricating bulk articles by sequential layer deposition of powder of wire feedstock fused using an energy beam. U.S. Pat. No. 5,398,193 propose a method of 3 dimensional rapid prototyping through controlled layer-wise deposition, and U.S. Pat. No. 4,863,538 proposes a method and apparatus for producing parts by selective sintering a layer of powder.

Figure 3:
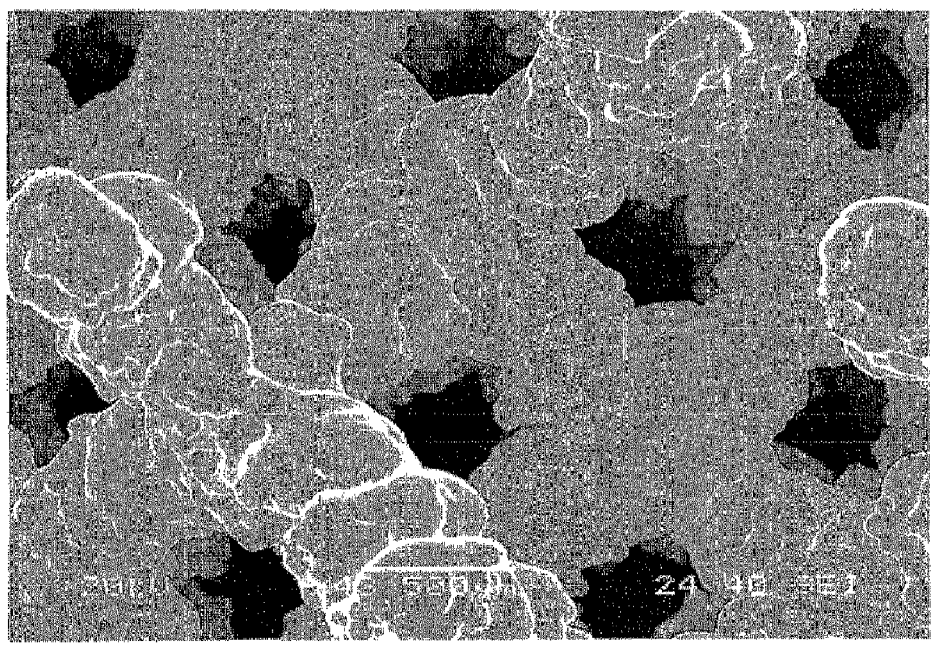
FIG. 3 shows a scanning electron microscope micrograph of a typical liner open porous structure.
Figure 4:
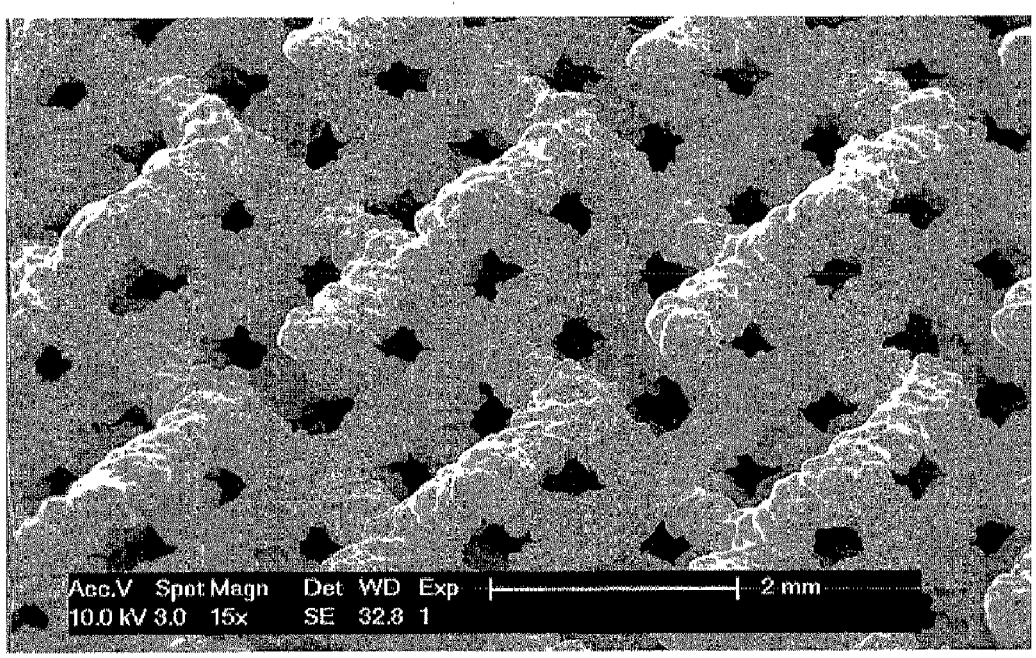
FIG. 4 shows a scanning electron microscope micrographs of the typical liner open porous structure at a different magnification.

FIGS. 3 and 4 show scanning electron microscope micrographs at two different magnifications of a typical liner open porous structure. The structure resembles a foam, but with regularly positioned pores whose size is typically constant at a given height within the liner but can vary through the thickness of the liner. The structure of the liner is defined by a computer generated model, and this information is then sliced into a large number of deposition layers (eg hundreds or thousands of layers). A laser is then guided by each layer of information, over a fine metal powder layer to melt together the metal particles. A layer of fresh powder is then swept over the previous layer and melted in a second laser pass to deposit the next layer. The process is repeated for the subsequent layers. Conveniently, the metal powder may be fed as a stream of powder directly into the laser beam at the point of deposition, and then rastered with the laser.

The layer-by-layer deposition procedure provides great control over the structure of the layer. It also allows liners to be formed with enhanced uniformity and repeatability, and with low incidence of manufacturing defects. Feedstock wastage may be 10% or less, compared with about 50% typical for thermal spraying.

The liner 30 can be grown directly on the casing 31. Alternatively, the liner can be produced separately and then attached directly, eg through brazing, welding or mechanical fixture, to the casing or to a carrier tile which is then fixed to the casing.

The metal feedstock for liner can vary depending on the application. However, typically, the metal can be nickel, iron, chromium or cobalt, or an alloy thereof. In some applications, it may be advantageous to fill the pores of the structure with eg polymer, metallic or ceramic material. This can be with the aim of providing an enhanced seal or improved cutting characteristics.

While the invention has been described in conjunction with the exemplary embodiments described above, many equivalent modifications and variations will be apparent to those skilled in the art when given this disclosure. For example, although described above in relation to an abradable liner attached to a casing for sealing against the tips of rotor blades, such a liner may be used to form seals in other area of a gas turbine engine, such as oil or air seals on shafts, discs and drums with eg knife type fins cutting into the liner. Also the liner can be on the moving component rather than the static component. Accordingly, the exemplary embodiments of the invention set forth above are considered to be illustrative and not limiting. Various changes to the described embodiments may be made without departing from the spirit and scope of the invention.

All references referred to above are hereby incorporated by reference.

The invention claimed is:

1. A seal between a first member and a second member, the first member being stationary in use and the second member being movable relative to the first member in use, the seal comprising a liner attached to the first member, the liner being abraded by the second member, the abradable liner comprising a metallic, open porous structure having a plurality of sub-layers of various pore size,
    wherein the plurality of sub-layers includes an outer layer, a mid-layer and an inner layer, and:
        the outer layer is adjacent the second member in use and has a smaller pore size than the inner layer and the mid-layer,
        the mid-layer is between the inner layer and the outer layer and has a larger pore size than the inner layer and the outer layer, and
        the inner layer joins the mid-layer to the first member, the inner layer having a pore size between that of the outer layer and the mid-layer.

2. The abradable liner according to claim 1, wherein pores of the abradable liner are filled with a material.

3. A method of forming a seal between first and second relatively members, the first member being stationary in use and the second member being movable relative to the first member in use, the method comprising:
    fusing a metallic feedstock with an energy beam to build up sequential deposits of the fused feedstock into a metallic, open porous structure,
    wherein the metallic, open porous structure is attached to the first member to form an abradable liner on the first member so that, in use, the abradable liner can be abraded by the second movable member,
    the abradable liner comprising a metallic, open porous structure having a plurality of sub-layers of various pore size,
        wherein the plurality of sub-layers includes an outer layer, a mid-layer and an inner layer, and:
            the outer layer is adjacent the second member in use and has a pore size smaller than the inner layer and the mid-layer,
            the mid-layer is between the inner layer and the outer layer and has larger pore size than the inner layer and the outer layer, and
            the inner layer joins the mid-layer to the first member, the inner layer having a pore size between that of the outer layer and the mid-layer.

* * * * *